United States Patent
Sevrinsky et al.

(10) Patent No.: US 9,558,164 B1
(45) Date of Patent: Jan. 31, 2017

(54) METHODS AND SYSTEM FOR CONVERTING WSDL DOCUMENTS INTO XML SCHEMA

(75) Inventors: Richard Sevrinsky, Beit Shemesh (IS); Shlomo Yona, Kfar Yona (IS)

(73) Assignee: F5 Networks, Inc., Seattle, WA (US)

( * ) Notice: Subject to any disclaimer, the term of this patent is extended or adjusted under 35 U.S.C. 154(b) by 498 days.

(21) Appl. No.: 12/354,357

(22) Filed: Jan. 15, 2009

Related U.S. Application Data (63) Continuation of application No. 12/347,601, filed on Dec. 31, 2008, now abandoned.

(51) Int. Cl.
*G06F 17/22* (2006.01)

(52) U.S. Cl.
CPC .................. *G06F 17/227* (2013.01)

(58) Field of Classification Search
USPC .................................... 715/237, 239
See application file for complete search history.

(56) References Cited

U.S. PATENT DOCUMENTS

| | | | |
|---|---|---|---|
| 6,330,574 B1 | 12/2001 | Murashita | |
| 6,363,056 B1 | 3/2002 | Beigi et al. | |
| 6,883,137 B1 | 4/2005 | Girardot et al. | |
| 6,970,924 B1 | 11/2005 | Chu et al. | |
| 6,973,490 B1 | 12/2005 | Robertson et al. | |
| 6,990,074 B2 | 1/2006 | Wan et al. | |
| 7,003,564 B2 | 2/2006 | Greuel et al. | |
| 7,065,482 B2 | 6/2006 | Shorey et al. | |
| 7,080,314 B1 | 7/2006 | Garofalakis et al. | |
| 7,089,491 B2 | 8/2006 | Feinberg et al. | |
| 7,191,163 B2 | 3/2007 | Herrera et al. | |
| 7,292,541 B1 | 11/2007 | CS | |
| 7,296,061 B2 * | 11/2007 | Martinez et al. | 709/211 |
| 7,296,263 B1 | 11/2007 | Jacob | |
| 7,409,440 B1 | 8/2008 | Jacob | |
| 7,860,815 B1 * | 12/2010 | Tangirala | 706/45 |
| 8,001,246 B2 * | 8/2011 | Lu et al. | 709/226 |
| 2002/0087571 A1 | 7/2002 | Stapel et al. | |
| 2002/0087744 A1 | 7/2002 | Kitchin | |
| 2002/0099829 A1 | 7/2002 | Richards et al. | |
| 2002/0174216 A1 | 11/2002 | Shorey et al. | |
| 2003/0018450 A1 | 1/2003 | Carley | |
| 2003/0033369 A1 * | 2/2003 | Bernhard | 709/203 |
| 2003/0191803 A1 * | 10/2003 | Chinnici et al. | 709/203 |
| 2003/0200289 A1 * | 10/2003 | Kemp et al. | 709/221 |
| 2003/0212954 A1 | 11/2003 | Patrudu | |
| 2003/0236995 A1 | 12/2003 | Fretwell, Jr. | |

(Continued)

OTHER PUBLICATIONS

Ken Levy; New XML Tools in Visual Studio 2005; Jul. 21, 2004; MSDN Blogs; p. 1.*

(Continued)

*Primary Examiner* — Andrew Dyer
(74) *Attorney, Agent, or Firm* — LeClairRyan, a Professional Corporation (57) ABSTRACT

A method and system for use of XML Schema in conjunction with XML Schema aware applications on a SOAP message including a request with a method defined by a WSDL document. A WSDL document is converted offline to XML Schema. A SOAP message containing a request is received. An XML Schema aware operation is performed on the SOAP message based on previously determined XML Schema derived from the WSDL document.

18 Claims, 4 Drawing Sheets

(56) References Cited

U.S. PATENT DOCUMENTS

| | | | |
|---|---|---|---|
| 2004/0006741 A1* | 1/2004 | Radja et al. | 715/513 |
| 2004/0015783 A1 | 1/2004 | Lennon et al. | |
| 2004/0123277 A1 | 6/2004 | Schrader et al. | |
| 2004/0133605 A1 | 7/2004 | Chang et al. | |
| 2004/0138858 A1 | 7/2004 | Carley | |
| 2004/0215665 A1 | 10/2004 | Edgar et al. | |
| 2004/0225656 A1* | 11/2004 | Sarkar | 707/9 |
| 2005/0160153 A1* | 7/2005 | Knutson et al. | 709/217 |
| 2005/0246717 A1* | 11/2005 | Poole et al. | 719/316 |
| 2006/0235976 A1* | 10/2006 | Chen et al. | 709/227 |
| 2006/0277606 A1* | 12/2006 | Yunus et al. | 726/25 |
| 2006/0282442 A1 | 12/2006 | Lennon et al. | |
| 2007/0011605 A1* | 1/2007 | Dumitru et al. | 715/513 |
| 2007/0150574 A1* | 6/2007 | Mallal et al. | 709/223 |
| 2008/0065653 A1* | 3/2008 | Shneur et al. | 707/100 |
| 2008/0168150 A1* | 7/2008 | Chen et al. | 709/206 |
| 2010/0138809 A1* | 6/2010 | Shenfield et al. | 717/104 |

OTHER PUBLICATIONS

Box et al.; Simple Object Access Protocol (SOAP) 1.1; May 8, 2000; W3C; pp. 1-34.*

* cited by examiner

METHODS AND SYSTEM FOR CONVERTING WSDL DOCUMENTS INTO XML SCHEMA

RELATED APPLICATION

This is a continuation application from U.S. Ser. No. 12/347,601 filed Dec. 31, 2008 to the same inventors. That application is hereby incorporated by reference in its entirety.

FIELD OF THE INVENTION

This invention generally relates to the conversion of WSDL documents, and more particularly, to a system and methods for conversion of WSDL documents into XML Schema for XML based applications and for data representation using XML.

BACKGROUND

With the widespread use of web-based applications and the Internet in general, different websites using the ubiquitous extensible markup language (XML) format have been used for clients requesting web-based applications from a web server or web application server. Various applications have been developed such that a representation of data or functionality or both for these applications are XML documents. Such documents may be checked by an XML-based application against various XML Schema to insure the validity and compatibility of the XML documents. Web-based servers may have additional applications that may include XML security-based applications that analyze XML documents to insure that data structures and their contents in the XML documents do not pose a security threat to the web application server.

There are numerous XML based standards and protocols that use XML's extensibility properties and provide higher levels of semantics of the data represented in XML documents. Web services, for example, use the web services description language (WSDL), a web services language, which is used to describe a web based network service. WSDL is a language that is based on XML but extends XML further. WSDL provides a way to group messages into operations and operations into interfaces for web services. WSDL also provides a way to define bindings for each interface and protocol combination along with the endpoint address for each one. A complete WSDL definition contains all of the information necessary to invoke a web service or application. WSDL documents are often used in combination with XML Schema documents in order to describe simple object access protocol (SOAP) messages. Once a web service is available, the description and a link are published in a repository so that potential users may find and access the service. When a user wishes to use the web service, a WSDL file is requested in order to find out the methods and functions that are offered by the service, along with their usage. The client uses this information in the WSDL file to form a Simple Object Access Protocol (SOAP) request to the server. A client device connecting to a web service can read the WSDL file to determine what functions are available on the server and is able to know precisely how to interact with the Web service it describes. Special data types in SOAP messages may be defined in a WSDL document using XML Schema Description Language. The client device then uses SOAP to actually call one of the functions listed in the WSDL file. A web server may use a WSDL document to enforce the structure and content of SOAP messages. Such enforcement may be a validation of the SOAP message against the WSDL document that defines and describes the web service.

There is a resemblance between validation of SOAP messages against a WSDL document and validation of general purpose XML documents against an XML Schema document. However, validation of SOAP messages against WSDL documents requires specialized processing tools that are different or are additional to those needed for XML document validation against XML Schema. SOAP messages require structural requirements beyond the basic syntactic requirements of well-formedness, that is, they need also to comply with a WSDL document. The nature of the validation against the WSDL document depends on implementation. General purpose XML processing tools and schema validation tools are commonly available for a vast variety of programming languages, platforms and systems; many times they are already available and do not require any installation. However, SOAP validation against WSDLs is still not as common. Thus, in order to validate SOAP messages against WSDLs, web applications and web services require functionality for this purpose in addition to existing XML and XML Schema processing tools. Many times, such additional applications are tailored specifically for specific WSDLs and require separate design and implementation for SOAP validation against WSDLs beyond the existing XML Schema validation facilities, thus increasing expense and complexity.

SUMMARY

According to one example, a method for applying XML Schema aware applications to SOAP messages containing a request with a method defined by a WSDL document is disclosed. A SOAP message containing a request is received. An XML Schema aware operation is performed on the SOAP message based on previously determined XML Schema derived from the WSDL document.

Another example disclosed is a machine readable medium having stored thereon instructions for applying XML Schema aware applications to SOAP messages containing a request with a method defined by a WSDL document. The machine readable medium has machine executable code which when executed by at least one machine, causes the machine to receive a SOAP message containing a request. The machine executable code also causes the machine to perform an XML Schema aware operation on the SOAP message based on previously determined XML Schema derived from the WSDL document.

Another example disclosed is a method for converting WSDL documents into XML Schema documents. A WSDL document including method definitions and a SOAP message is received. A base schema is created. The method definitions are converted into XML elements. The SOAP message is considered as an XML document. An XML Schema is created from the base schema and the converted WSDL document.

Additional aspects will be apparent to those of ordinary skill in the art in view of the detailed description of various embodiments, which is made with reference to the drawings, a brief description of which is provided below.

While these examples are susceptible of embodiment in many different forms, there is shown in the drawings and will herein be described in detail preferred examples with the understanding that the present disclosure is to be considered as an exemplification and is not intended to limit the broad aspect to the embodiments illustrated.

DETAILED DESCRIPTION

Currently, validation of SOAP messages against WSDL documents requires applications with separate design and implementation tailored toward WSDL validation in addition to existing and more common XML Schema validation for general purpose XML instances/documents. Currently, XML Schema based validation infrastructure is not used in validation of SOAP messages against WSDL documents, except perhaps to XML Schema data type validation. In many cases, SOAP messages are not validated at all against a WSDL document, which increases the risk of malicious or inoperable requests. Applications that do validate SOAP messages against a WSDL document tend to implement ad-hoc sanity and validation logic, which rarely is flexible or generic enough to function properly when WSDL documents are updated or are replaced.

Figure 1:
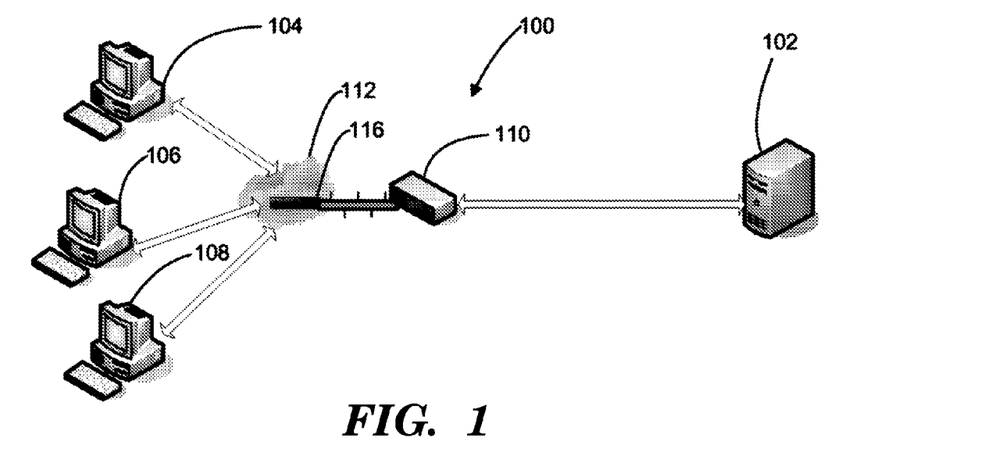
FIG. 1 is a block diagram of a network system using one example of a process allowing conversion of WSDL documents into XML schema documents.

FIG. 1 is a block diagram of an example system 100 that includes a web application server 102 that may provide web-based applications over a wide area network 112. The network 112 may provide responses and requests from external devices according to the HTTP-based application protocol in this example, but the principles discussed herein are not limited to this example and can include other application protocols such as non-TCP standards with similar characteristics. The system 100 may include a series of one or more external web-enabled client devices 104, 106, and 108, and a network traffic manager 110 coupled to the client devices 104, 106, and 108 through the network 112.

Generally, the client devices 104, 106, and 108 may include virtually any computing device capable of connecting to another computing device to send and receive information and preferably web-based information. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, and the like. Alternatively, client devices 104, 106, and 108 may be any device that is capable of connecting using a wired or wireless communication medium such as a PDA, POCKET PC, wearable computer, and any other device that is equipped to communicate over a wired and/or wireless communication medium.

The client devices 104, 106, and 108 may be configured as public systems, such as kiosks, home computing devices, personal computing devices, personal mobile computing devices, and the like, that are used by an employee, or the like, of the enterprise to access an enterprise resource, such as the web application server 102. Such client devices may not be issued or maintained by the enterprise, typically resulting in a classification as an untrusted device.

Similarly, client devices 104, 106, and 108 may be maintained, issued, and configured by a business partner, and the like. These client devices may also be classified as untrusted devices. Such client devices may be employed by such non-employees to the enterprise to seek access to an enterprise resource, for example, to share a file, obtain extranet access, and a similar limited resource.

The client devices 104, 106, and 108 may also be configured, maintained, and issued by the enterprise to an employee, and the like, of the enterprise. Such client devices may be considered to be trusted devices. Degrees of trust may also be employed to describe client devices 104, 106, and 108. For example, a personal laptop may be considered to have a higher level of trust than a kiosk. Similarly, an enterprise maintained and issued laptop may have a higher level of trust than the personal laptop, but a lower level of trust than an enterprise desktop.

The client devices 104, 106, and 108, in this example, may run web browsers that may provide an interface to make requests to different web server-based applications via the network 112. A series of web-based applications may run on the web application server 102 that allow the transmission of data that is requested by the client devices 104, 106, and 108. The client devices 104, 106, and 108 are aware of published web applications available on the web application server 102, which are described in a WSDL document. As will be explained, the web service methods requested by clients such as the client device 104 from the web service on the server 102 are validated against XML Schema that are equivalent to the WSDL document that describes and defines the web service. The client devices 104, 106, and 108 may be further configured to enable a secure communication with the network traffic appliance 110 using such mechanisms as Secure Sockets Layer (SSL), IPSec, Tunnel Layer Security (TLS), and the like. In one embodiment, client devices 104, 106, and 108 are configured to establish a communication with a network traffic manager employing an IPSec VPN.

In this example, the network 112 is the Internet. However, the network 112 may include local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

The network 112 may further employ a plurality of wireless access technologies including, but not limited to, 2nd (2G), 3rd (3G) generation radio access for cellular systems, Wireless-LAN, Wireless Router (WR) mesh, and the like. Access technologies such as 2G, 3G, and future access networks may enable wide area coverage for mobile devices, such as client device 104 with various degrees of mobility. For example, the network 112 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like.

Furthermore, remote computers and other related electronic devices may be remotely connected to either LANs or WANs via a modem and temporary telephone link. In essence, the network 112 includes any communication method by which information may travel between client devices 104, 106, and 108 and the web application server 102 and the like.

Additionally, the network 112 may include communication media that typically embody computer-readable instructions, data structures, program modules, or other data in a modulated data signal such as a carrier wave, data signal, or other transport mechanism and includes any information delivery media. The terms "modulated data signal," and "carrier-wave signal" include a signal that has one or more of its characteristics set or changed in such a manner as to encode information, instructions, data, and the like, in the signal. By way of example, communication media may include wired media such as, but not limited to, twisted pair, coaxial cable, fiber optics, wave guides, and other wired media and wireless media such as, but not limited to, acoustic, RF, infrared, and other wireless media.

The web application server 102 may provide data such as web-based data in response to requests directed toward the respective web-based applications on the web application server 102 from the client devices 104, 106, and 108. As per the TCP, packets may be sent to the web application server 102 from the requesting client devices 104, 106, and 108 to establish a connection or to send data for an existing connection. It is to be understood that the web application server 102 may be hardware or software or may represent a system with multiple servers that may include internal or external networks. In this example the web application server 102 may be any version of MICROSOFT® IIS servers or APACHE® servers, although other types of servers may be used. Further, additional servers may be coupled to the network 112 and many different types of applications may be available on servers coupled to the network 112.

The network traffic appliance 110 may be interposed between the network 112 and the processor or processors of the web application server 102 as shown in FIG. 1. The network traffic appliance 110 may route data from the network 112 to the web applications run by the processors on the web application server 102. As will be detailed below, the network traffic appliance 110 may receive packets that may include data requested for the server applications running on server 102 from the client devices 104, 106, and 108. The packets may be routed from the client devices 104, 106, and 108 to the server 102 via a router 116. In this example, the network traffic appliance 110 may perform several network functions such as load balancing, access control, and XML processing such as XML well-formedness checks, XML Schema validation, and other security oriented inspections of the incoming traffic. It is to be understood that the web application server 102 is a single server for example purposes only; other servers may be coupled to the network traffic appliance 110 or the web application server 102 may be a cluster of servers with load balancing functions performed by the network traffic appliance 110. Of course it is to be understood that such a cluster of servers may perform its own load balancing, fault tolerance, and high availability in addition to other functions.

Figure 2:
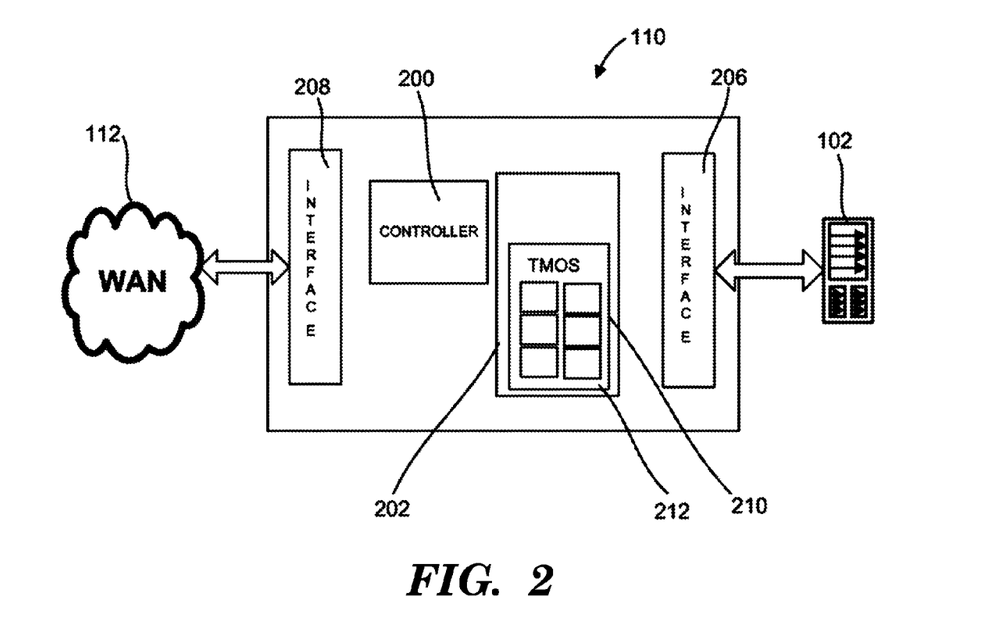
FIG. 2 is a block diagram of a network traffic manager of FIG. 1 that may run applications using SOAP messages that may be validated against XML Schema documents that were converted from WSDL documents.

FIG. 2 is a block diagram of the network traffic appliance 110 in FIG. 1. The network traffic appliance 110 may include a controller 200, a memory 202, and an interface 206 that may send responses to and receive requests from devices such as the web application server 102 through the network 112 in FIG. 1. In this example, the interface 206 may be an Ethernet connection. The network traffic appliance 110 may have a wide area network interface 208 that may send requests to and receive responses from the wide area network 112 in FIG. 2. An example of a network traffic appliance 110 that may perform a security function such as XML security is the BIG IP™ traffic manager product available from F5 NETWORKS, INC. of Seattle, Wash., although other network traffic controllers could be used.

A traffic management operating system (TMOS) 210 may be stored on the memory 202 and may be run by the controller 200. The traffic management OS 210 may have a modular structure with different modules 212 to perform various network traffic management functions. It is also to be understood that the traffic management OS 210 with the modules 212 may be operated on any suitable traffic management device. An example of a module 212 is the BIG-IP™ Application Security Manager (ASM) available from F5 NETWORKS, INC. of Seattle, Wash., which delivers comprehensive protection for Web applications and operational infrastructure.

An example of the traffic management OS 210 may be the TMOS® platform available from F5 NETWORKS, INC. of Seattle, Wash., although other traffic management applications could be used. The traffic management OS 210 may provide functions such as performance, security, availability, and management. The traffic management OS 210 may provide shared application services, such as IRULES, rate shaping, resource cloaking, transaction assurance, universal persistence, caching, compression, encryption, authentication, application health monitors, and application switching, that are run by the application modules 212. The traffic management OS 210 may also provide shared network services including TCP EXPRESS™, protocol sanitization, high performance SSL, DoS and DDos protection, VLAN segmentation, line rate switching, IP packet filtering, dynamic routing, secure network address translation, port mapping, and common management framework.

The web server such as the web application server 102 may use WSDL documents to describe web services that are available on it which expect to communicate using simple object access protocol (SOAP) messages. SOAP messages are sent to the web application server 102 via a client device such as the client device 104 in FIG. 1. In this example, a WSDL document may be converted to XML Schema prior to the receipt of the SOAP messages for web applications. The SOAP messages received by the network traffic manager 110 may be examined using XML Schema aware software applications such as XML processing tools such as a validating parser. The XML Schema is derived from the WSDL document.

The conversion requires a WSDL document that may be obtained offline. The client devices may determine the web service methods offered by the web application server 102 by obtaining the WSDL document. The WSDL document informs the clients how to send a well formed SOAP message with the appropriate request structure to the appropriate web service on the web application server 102.

Figure 3:
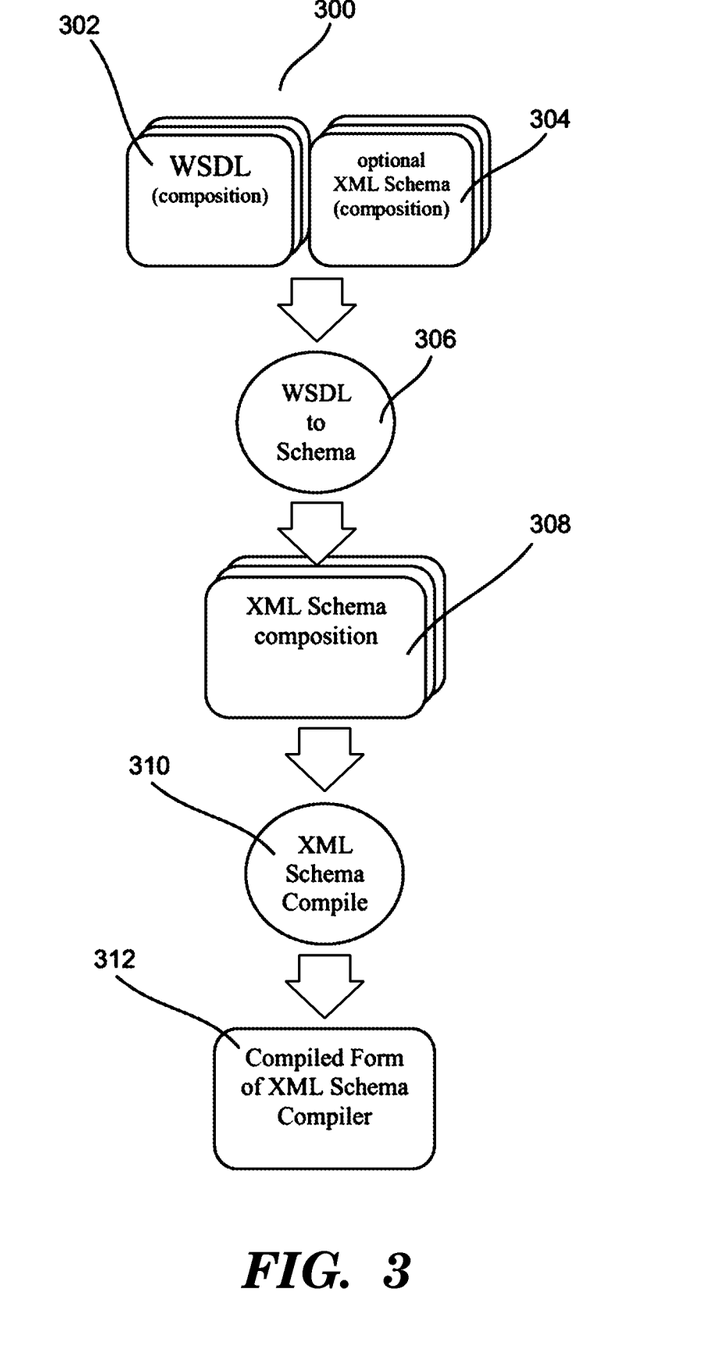
FIG. 3 is a diagram of the offline process of producing XML Schema documents from WSDL documents.

FIG. 3 shows the WSDL document and XML Schema of the offline conversion process. In this example, the offline conversion process may involve a WSDL file converter that may run on the web application server 102. A WSDL file 300 may be a composition of several WSDL documents and optionally import XML Schema documents 304. The WSDL file converter may accept as parameters the filename of the base WSDL, a set of mappings for externally referenced WSDL and/or schema documents, a flag whether to load externally referenced WSDL and/or schema documents, and an output directory in which to generate the resulting schema documents. In this example, the WSDL converter may create in the output directory a base schema 306, based on the SOAP envelope schema ("base.xsd"), a base schema for SOAP 1.2, based on the SOAP 1.2 envelope schema ("soap-envelope-12.xsd"), a schema for each namespace of SOAP actions ("wsdl_actions*.xsd"), a schema document for each schema taken from the <types> element ("internal_types*.xsd") and a copy of the SOAP encoding schema.

A base schema 308 may be created by starting with the SOAP envelope schema. The <any> tag within the "Body" element is removed, and may be replaced with an <any> tag that only allows exactly one element from any target namespace of SOAP actions within the WSDL(s). <import> tags may be added to reference the SOAP action schema documents. A schema document may be created for each names pace used by at least one SOAP action within the WSDL file(s). Each <message> tag in the WSDL file may be converted into a complexType. The <message> name may be converted into the complexType name by replacing all spaces with two underscores (since spaces are not legal for a complexType name) and by appending "_method." Each <part> within the <message> is converted into an element within the complexType's sequence. If the <part> has a type, the type may be used for the element. If the <part> refers to another element, a reference (ref) to that element may be used instead. The element and/or complexType are not added if already defined in an externally linked schema or in a schema defined in the <types> element.

To create the corresponding elements for the method, the method may also be defined in an <operation> element within the <portType> element, which will determine namespace and whether the action is a request or a response. The soapAction (and namespace, if not defined in the portType) for each method may be extracted from the <operation> element within the <binding> element. Other WSDL files referenced by the WSDL <import> element (rather than the schema <import> element) may be appended to the queue of WSDL documents to be parsed and converted. Each <schema> within the <types> element may be extracted to form its own schema document. <include> elements may be added to each top-level schema (not included by another schema) for other schemas within the same namespace. <import> elements are added to each top-level schema for all other top-level schemas in all namespaces. The SOAP encoding schema may be imported into all schemas as well.

The resulting XML Schema 308 may be automatically associated with the URL in the location attribute of the SOAP <address> element. The XML Schema is compiled 310 to produce a compiled form of the XML Schema compiler 312. A list of SOAP actions and methods (with their namespaces) may then be returned to the requesting client device or devices after the completion of the offline process above.

Figure 4:
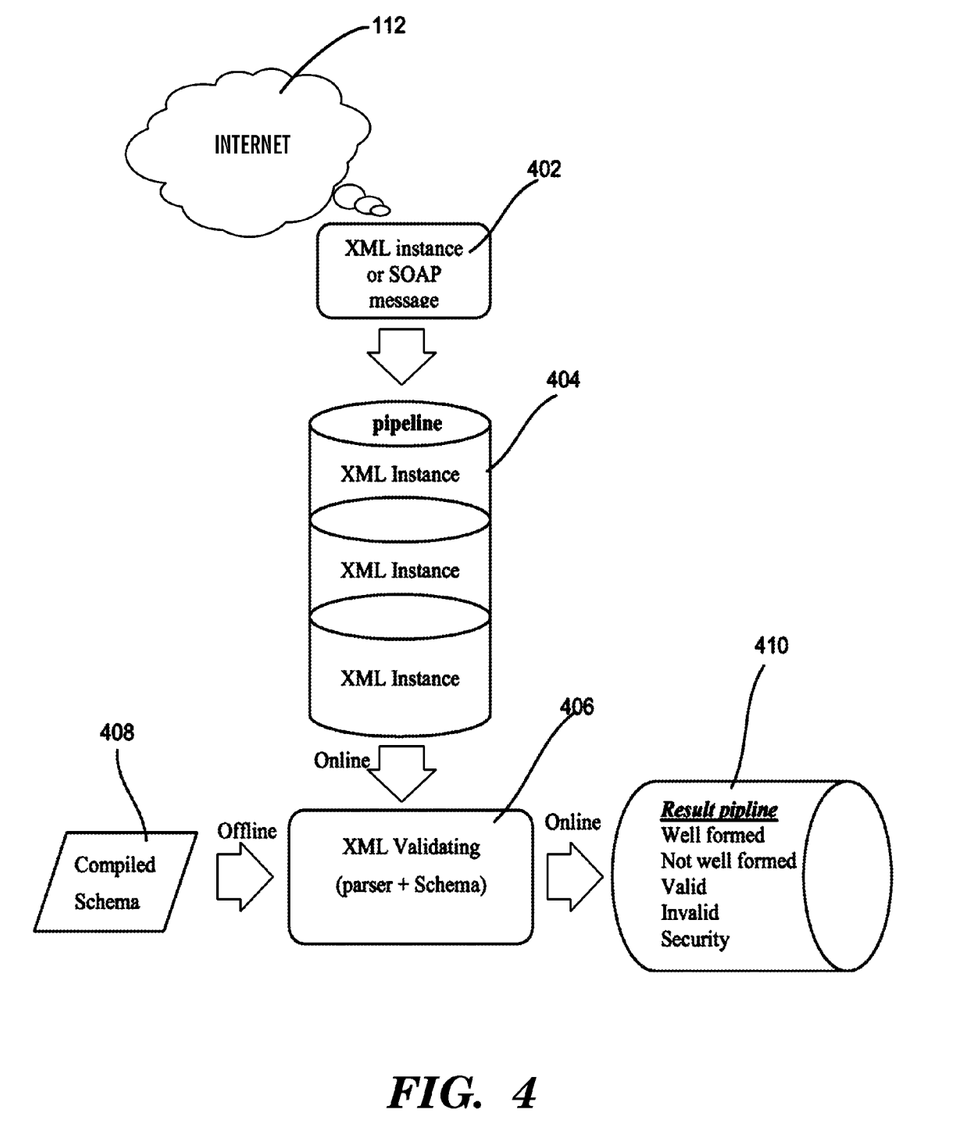
FIG. 4 is a diagram of the online process for validating SOAP messages against an XML Schema that is equivalent to validating them against a WSDL document.

After the completion of the offline process to provide XML Schema for a WSDL file, XML Schema aware applications such as processing tools may be used to process SOAP messages as shown in FIG. 4. In this example, the network traffic appliance 110 receives a SOAP message 402 from the network 112. The network traffic appliance 110 may then put the SOAP message in a pipeline as XML instances 404. The XML instances may then be examined with compiled XML Schema 408 stored on the network traffic appliance 110 for firewall purposes for example and determined whether the SOAP message is valid against the XML Schema which was generated from the WSDL document. In the example of validation, the SOAP message validation may be performed similarly to how an XML instance is validated against an XML Schema 406 and therefore validation tools for XML documents may be used. The XML Schema definitions and declarations may be wrapped in the parent schema defining permitted structures of the SOAP envelope from the offline process explained in FIG. 3 above. The target namespace of the main schema document may be the SOAP envelope's namespace. Schemas defined within the WSDL types may be extracted to form their own schema documents that are composed together into the main schema documents in the offline process described above in reference to FIG. 3. This may result in a set of XML Schema with schema composition relations. The resulting XML Schema may have names that are selected to avoid name and definition conflicts among the generated XML Schema definition and declarations.

The SOAP message 402 may be a well-formed XML document that may use a SOAP envelope and SOAP encoding namespaces. The SOAP message may include an XML declaration followed by a SOAP envelope including a SOAP header and a SOAP body. The SOAP generally may define a set of rules for structuring messages that may be used for simple one-way messaging and is useful for performing RPC style request-response dialogs for remote server applications such as web-based applications.

A results pipeline 410 may be produced that orders the syntax checks on incoming SOAP messages as well as XML Schema validation checks of them against the resulting XML Schema documents that were produced offline in the process described in FIG. 3. Checks on XML/SOAP traffic are not restricted to XML well-formedness and XML Schema validation and can also include other security checks.

Each of the web application server 102, network traffic appliance 110, and client devices 104, 106, and 108 may include a central processing unit (CPU), controller or processor, a memory, and an interface system that are coupled together by a bus or other link, although other numbers and types of each of the components and other configurations and locations for the components can be used. The processors in the web application server 102 or the network traffic appliance 110 may execute a program of stored instructions for one or more aspects of the methods and systems as described herein, including for rapid protection of the network via simultaneous checking according to access rules, although the processor could execute other types of programmed instructions. The memory may store these programmed instructions for one or more aspects of the methods and systems as described herein, including the method for protecting the server against denial of service attacks, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium that is read from and/or written to by a magnetic, optical, or other reading and/or writing system that is coupled to the processor, may be used for the memory. The user input device may comprise a computer keyboard and a computer mouse, although other types and numbers of user input devices may be used. The display may comprise a computer display screen, such as a CRT or LCD screen by way of example only, although other types and numbers of displays could be used.

Although an example of the web application server 102, network traffic appliance 110, and client devices 104, 106, and 108 are described and illustrated herein in connection with FIGS. 1 and 2, each of the computers of the system 100 could be implemented on any suitable computer system or computing device. It is to be understood that the example devices and systems of the system 100 are for exemplary purposes, as many variations of the specific hardware and software used to implement the system 100 are possible, as will be appreciated by those skilled in the relevant art(s).

Furthermore, each of the devices of the system 100 may be conveniently implemented using one or more general purpose computer systems, microprocessors, digital signal processors, micro-controllers, application specific integrated circuits (ASIC), programmable logic devices (PLD), field programmable logic devices (FPLD), field programmable gate arrays (FPGA) and the like, programmed according to the teachings as described and illustrated herein, as will be appreciated by those skilled in the computer, software, and networking arts.

In addition, two or more computing systems or devices may be substituted for any one of the systems in the system 100. Accordingly, principles and advantages of distributed processing, such as redundancy, replication, and the like, also can be implemented, as desired, to increase the robustness and performance of the devices and systems of the system 100. The system 100 may also be implemented on a computer system or systems that extend across any network environment using any suitable interface mechanisms and communications technologies including, for example telecommunications in any suitable form (e.g., voice, modem, and the like), Public Switched Telephone Network (PSTNs), Packet Data Networks (PDNs), the Internet, intranets, a combination thereof, and the like.

Figure 5:
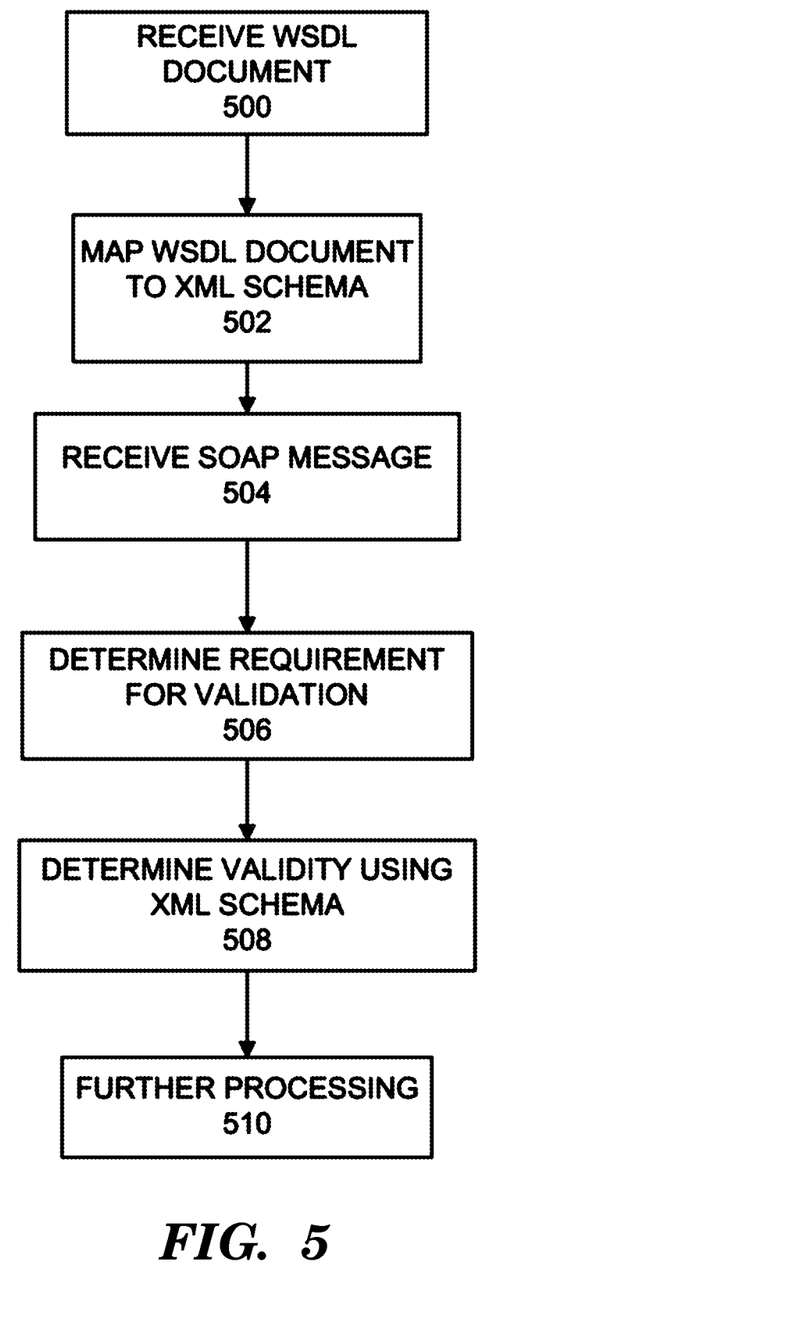
FIG. 5 is a flow diagram of a method for evaluating a WSDL SOAP message with XML Schema for an XML-based application.

The operation of the example WSDL conversion into XML Schema documents from a WSDL document that describes a web service and use of the XML Schema is shown in the flow diagram of FIG. 5. The flow diagram in FIG. 5 is representative of example machine readable instructions for implementing the application of XML Schema on requests for WSDL functions. In this example, the machine readable instructions comprise an algorithm for execution by: (a) a processor, (b) a controller, and/or (c) one or more other suitable processing device(s). The algorithm may be embodied in software stored on tangible media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or embodied in firmware or dedicated hardware in a well-known manner (e.g., it may be implemented by an application specific integrated circuit (ASIC), a programmable logic device (PLD), a field programmable logic device (FPLD), a field programmable gate array (FPGA), discrete logic, etc.). For example, any or all of the components of the network traffic appliance 110 could be implemented by software, hardware, and/or firmware. Also, some or all of the machine readable instructions represented by the flowchart of FIG. 5 may be implemented manually.

Further, although the example algorithm is described with reference to the flowchart illustrated in FIG. 5, persons of ordinary skill in the art will readily appreciate that many other methods of implementing the example machine readable instructions may alternatively be used. For example, the order of execution of the blocks may be changed, and/or some of the blocks described may be changed, eliminated, or combined.

FIG. 5 is a flow diagram of the offline and online processes that allows use of XML Schema on a received SOAP message in order to validate it using XML Schema validation as if it was validated against the WSDL document of the web service. In FIG. 5, a WSDL document indicating the description of a web service is received offline (500). XML Schema are derived from the WSDL document offline and loaded into the server 102 or the network traffic appliance 110 (502). A SOAP message including a request for a functionality of the web service may be received from the network 112 by the network traffic appliance 110 via the router 116 and the Ethernet connection 206 in FIGS. 1 and 2 (504). The network traffic appliance 110 may determine that the SOAP message requires validation against the WSDL document of the web service (506). The network traffic appliance 110 may then use the XML Schema associated with the WSDL document that was previously determined offline via the process described above in FIG. 3 for an XML based application such as a validation application (508). The network traffic appliance 110 takes the results of the validation and may determine whether to pass the SOAP request to the server 102. If the SOAP request is valid, the validated request may then be passed to the web application server 102 (510).

The processes described above may also support WS* standards. It is possible to incorporate the XML Schema that defines the specific structures that are defined in the WS* standards into the conversion such that the resulting XML Schema document is able to validate incoming SOAP messages against a WSDL document with the additional functionality of validating the structure of the WS* parts of that message. For example, in order to enforce the structure of the OASIS SOAP Message Security: UsernameToken profile standard the XML Schema that defines the structures that are yielded from this standard are added to the conversion process and allows SOAP messages to be validated for the proper structure and usage of this standard.

Having thus described the basic concepts, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the examples. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method comprising:

receiving, by a network traffic management apparatus, a web services description language (WSDL) document, wherein the WSDL document comprises a plurality of namespaces each corresponding to one or more of a plurality of Simple Object Access Protocol (SOAP) actions and is associated with a specified web service;

converting, by the network traffic management apparatus, the WSDL document into a plurality of Extensible Markup Language (XML) Schemas each corresponding to at least one of the namespaces, wherein the XML Schemas are collectively representative of the WSDL document for the specified web service;

subsequently receiving, by the network traffic management apparatus, a request in the form of a SOAP message from a client device to access the specified web service;

determining, by the network traffic management apparatus, when the SOAP message is valid based on a comparison of the SOAP message against one or more of the XML Schemas converted from the WSDL document; and forwarding, by the network traffic management apparatus, the SOAP message to a web server hosting the specified web service when the determining indicates that the SOAP message is valid.

2. The method of claim 1, wherein the determining further comprises determining when the SOAP message is well formed based on the WSDL document.

3. The method of claim 1, wherein the determining further comprises performing a security check on the SOAP message.

4. The method of claim 1, wherein the SOAP message comprises a request for a web-based application.

5. The method of claim 1, wherein the WSDL document is a composition of a plurality of WSDL files and at least one XML Schema file.

6. The method of claim 1, wherein the SOAP message includes a SOAP envelope comprising a header, a body, or SOAP encoding namespaces.

7. A non-transitory computer readable medium having stored thereon instructions for performing a method, comprising machine executable code which, when executed by at least one processor, causes the processor to perform steps comprising:

receiving a web services description language (WSDL) document, wherein the WSDL document comprises a plurality of namespaces each corresponding to one or more of a plurality of Simple Object Access Protocol (SOAP) actions and is associated with a specified web service;

converting the WSDL document into a plurality of Extensible Markup Language (XML) Schemas each corresponding to at least one of the namespaces, wherein the XML Schemas are collectively representative of the WSDL document for the specified web service;

subsequently receiving a request in the form of a SOAP message from a client device to access the specified web service;

determining when the SOAP message is valid based on a comparison of the SOAP message against one or more of the XML Schemas converted from the WSDL document; and forwarding the SOAP message to a web server hosting the specified web service when the determining indicates that the SOAP message is valid.

8. The medium of claim 7, wherein the determining further comprises determining when the SOAP message is well formed based on the WSDL document.

9. The medium of claim 7, wherein the determining further comprises performing a security check on the SOAP message.

10. The medium of claim 7, wherein the SOAP message comprises a request for a web-based application.

11. The medium of claim 7, wherein the WSDL document is a composition of a plurality of WSDL files and at least one XML Schema file.

12. The medium of claim 7, wherein the SOAP message includes a SOAP envelope comprising a header, a body, or SOAP encoding namespaces.

13. A network traffic management apparatus comprising a memory comprising programmed instructions stored in the memory and a processor coupled to the memory and configured to be capable of executing the programmed instructions stored in the memory to:

receive a web services description language (WSDL) document, wherein the WSDL document comprises a plurality of namespaces each corresponding to one or more of a plurality of Simple Object Access Protocol (SOAP) actions and is associated with a specified web service;

convert the WSDL document into a plurality of Extensible Markup Language (XML) Schemas each corresponding to at least one of the namespaces, wherein the XML Schemas are collectively representative of the WSDL document for the specified web service;

subsequently receive a request in the form of a SOAP message from a client device to access the specified web service;

determine when the SOAP message is valid based on a comparison of the SOAP message against one or more of the XML Schemas converted from the WSDL document; and forward the SOAP message to a web server hosting the specified web service when the determining indicates that the SOAP message is valid.

14. The apparatus of claim 13, wherein the processor is further configured to be capable of executing the programmed instructions stored in the memory to determine when the SOAP message is well formed based on the WSDL document.

15. The apparatus of claim 13, wherein the processor is further configured to be capable of executing the programmed instructions stored in the memory to perform a security check on the SOAP message.

16. The apparatus of claim 13, wherein the SOAP message comprises a request for a web-based application.

17. The apparatus of claim 13, wherein the WSDL document is a composition of a plurality of WSDL files and at least one XML Schema file.

18. The apparatus of claim 13, wherein the SOAP message includes a SOAP envelope comprising a header, a body, or SOAP encoding namespaces.

* * * * *